United States Patent [19]

Artaud et al.

[11] Patent Number: 4,655,996
[45] Date of Patent: Apr. 7, 1987

[54] EAST NEUTRON REACTOR HAVING A STORAGE STRUCTURE INDEPENDENT OF THE CORE STRUCTURE

[75] Inventors: Robert Artaud, Aix-en-Provence; Michel Aubert, Manosque; Charley Renaux, Jouques, all of France

[73] Assignee: Commissariat a l'Energie Atomique, Paris, France

[21] Appl. No.: 539,393

[22] Filed: Oct. 6, 1983

[30] Foreign Application Priority Data

Oct. 7, 1982 [FR] France ................. 82 16808

[51] Int. Cl.⁴ ............................................. G21C 19/00
[52] U.S. Cl. ..................................... 376/272; 376/404; 376/405
[58] Field of Search ....................... 376/272, 404, 405

[56] References Cited

U.S. PATENT DOCUMENTS

| | | | |
|---|---|---|---|
| 3,882,313 | 5/1975 | Siemens, Jr. | 376/272 X |
| 4,256,538 | 3/1981 | Scott | 376/272 X |
| 4,348,354 | 9/1982 | Artaud et al. | 376/405 |
| 4,481,165 | 11/1984 | Anderson et al. | 376/272 |
| 4,487,742 | 12/1984 | Bret | 376/405 X |

FOREIGN PATENT DOCUMENTS

| | | |
|---|---|---|
| 1322563 | 5/1962 | France . |
| 2168199 | 1/1972 | France . |
| 2180517 | 4/1972 | France . |
| 2246941 | 10/1973 | France . |
| 878701 | 10/1961 | United Kingdom ............ 376/405 |

OTHER PUBLICATIONS

Nuclear Engineering International (vol. 21, No. 246 (1976-7).

Primary Examiner—Peter A. Nelson

[57] ABSTRACT

Fast neutron nuclear reactor, which comprises a vessel containing a liquid cooling metal, a core immersed in this metal, the vessel having a flooring on which rests a structure for the core, said core being constituted by a juxtapositioning of assemblies fixed into the structure, the liquid cooling metal circulating in an upwards manner in the core, the liquid metal being called "cold liquid metal" before its circulation in the core and "hot liquid metal" after it has passed into the latter, wherein it comprises a fuel element storage structure, which is independent of the core structure and is arranged concentrically with respect to the latter and rests on the flooring, a circulation of cold liquid metal being ensured in the assembly by recovering leaks of the core structure.

7 Claims, 6 Drawing Figures

EAST NEUTRON REACTOR HAVING A STORAGE STRUCTURE INDEPENDENT OF THE CORE STRUCTURE

BACKGROUND OF THE INVENTION

The invention relates to a fast neutron nuclear reactor having a storage structure independent of the core structure.

It more particularly applies to a fast neutron reactor cooled by means of a liquid metal, e.g. sodium. Such a reactor has a vertically axed main vessel containing the liquid cooling metal in which is immersed the reactor core. The core is constituted by a group of elongated boxes, each containing a bundle of sheathed needles or rods containing the fissile and/or fertile material. At the upper end of said boxes, there is a gripping head, which makes it possible to raise and transfer them. At the bottom thereof, there is a base or foot making it possible to position them in a horizontal support structure, which rests on a flooring fixed to the bottom of the vessel.

During the life of the reactor, it is necessary to periodically replace the spent assemblies by new assemblies. This handling operation is generally carried out by means of an arm or a grapnel, which transfers the assemblies into a loading and unloading container, which makes it possible to remove the assemblies from the reactor vessel.

In the known solutions, the extraction from the core of irradiated assemblies with a view to their replacement by new assemblies, is followed by storage within the vessel and outside the core in an area where the assembly in question can be partly cooled and lose part of its residual activity before being removed from the main vessel for storing outside, where its activity continues to decrease.

However, in the present state of the art, the storage area forms an integral part of the core structure. This leads to an increase in the dimensions of said structure and particularly an increase in its diameter. Among the other disadvantages caused by it, it makes it necessary to provide in the slab sealing the vessel, an opening which is sufficiently large to permit the passage of the structure.

SUMMARY OF THE INVENTION

The present invention relates to a fast neutron nuclear reactor, which solves these problems due to the presence of a storage structure independent of the core structure.

More specifically, the present invention relates to a fast neutron nuclear reactor, which comprises a vessel containing a liquid cooling metal, a core immersed in this metal, the vessel having a flooring on which rests a structure for the core, said core being constituted by a juxtapositioning of assemblies fixed into the structure, the liquid cooling metal circulating in an upwards manner in the core, the liquid metal being called "cold liquid metal" before its circulation in the core and "hot liquid metal" after it has passed into the latter, wherein it comprises a fuel element storage structure, which is independent of the core structure and is arranged concentrically with respect to the latter and rests on the flooring, a circulation of cold liquid metal being ensured in the assembly by recovering leaks of the core structure.

Numerous advantages result from this arrangement. The core structure and the storage structure are two separate parts, which can be installed separately in the reactor. The dimensions of the core structure and in particular its diameter are reduced.

As the core structure is preferably introduced by the opening of the rotary plug, this permits the reduction to the same extent of the thrust or abutment on the minimum diameter of the rotary plug. Moreover, the storage structure does not require such a precise machining as the core structure.

The storage structure which is hydraulically connected to the flooring can be constituted by a one-piece ring, or can be formed from two or more modules. This storage structure can be placed and fixed on the flooring, or constitutes a monolithic structure with the flooring in the variant of a one-piece ring.

Preferably, the storage structure has a free space in which is placed a reactor loading and unloading station. This arrangement makes it possible to move this station closer to the core and consequently reduce the diameter of the main vessel, which is a very important advantage in view of the economies resulting therefrom.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
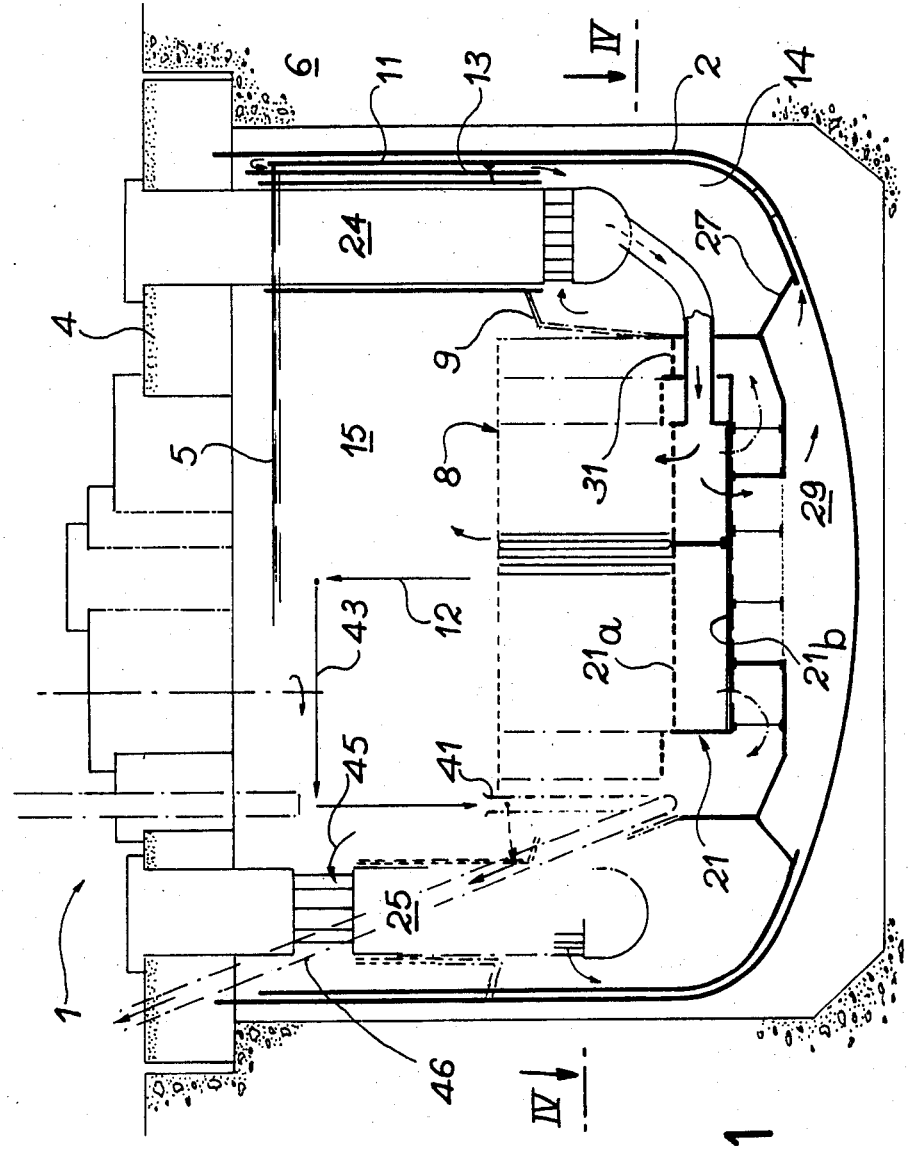
FIG. 1 a diagrammatic sectional view of a fast neutron nuclear reactor having an independent storage structure according to the invention.

FIG. 1 is a sectional view of a fast neutron nuclear reactor 1 having a storage structure in accordance with the present invention. The nuclear reactor 1 comprises a vertically axed vessel 2, suspended on a horizontal slab 4 and filled with a liquid cooling metal 5, generally sodium. The level of the liquid sodium is surmounted by a layer of inert gas, normally argon. The horizontal slab 4 rests on a thick-walled concrete enclosure 6. The reactor core 8 placed inside a supplementary vessel or internal vessel 9, which defines two separate regions in main vessel 2, is immersed in the liquid sodium 5. It is essentially constituted by fuel assemblies and fertile assemblies.

The right-hand half-view shows a special construction of the nuclear reactor vessel. This is characterized by the fact that it has a cylindrical ferrule or baffle 11 leaving a first annular space between it and vessel 2. Within baffle 11, there is a second ferrule 13, which is also called a counterbaffle, leaving between it and baffle 11 a second annular space. The annular space between vessel 2 and baffle 11 is used for supplying cold liquid metal. The annular space between baffles 11 and 13 is used for the removal thereof. A nuclear reactor of this type is described in French Pat. No. 7,536,226, filed on Nov. 26, 1975 in the name of the Commissariat à l'Energie Atomique and entitled "Nuclear reactor".

No matter what the reactor vessel construction, i.e. no matter whether it does or does not have a baffle and a counter-baffle, the assemblies 10 are fixed into a structure 21 integral with a flooring 27, which rests on the bottom of vessel 2.

The nuclear reactor has means making it possible to ensure the circulation of liquid cooling metal. These means are constituted by circulating pumps 24 (FIGS. 1 and 2) and exchangers 25 arranged on the periphery of vessel 2. At the outlet of pump 23, the sodium is introduced under high pressure at the base of the assemblies and traverses the latter from bottom to top in order to leave it in the upper part of the core. Thus, the internal vessel 9 defines a cold collector 14 located in the lower part of the vessel and a hot collector 15 in the upper part thereof. At the core inlet, the sodium has a temperature of approximately 400° C. and a temperature of approximately 550° C. at its outlet. The heat accumulated during the passage in the core is transferred into heat exchangers 25. Sodium passes through these exchangers from top to bottom and leaves them in the lower part, passing into the cold collector, where it is again drawn in by the circulating pumps for reintroduction into the structure.

Figure 2:
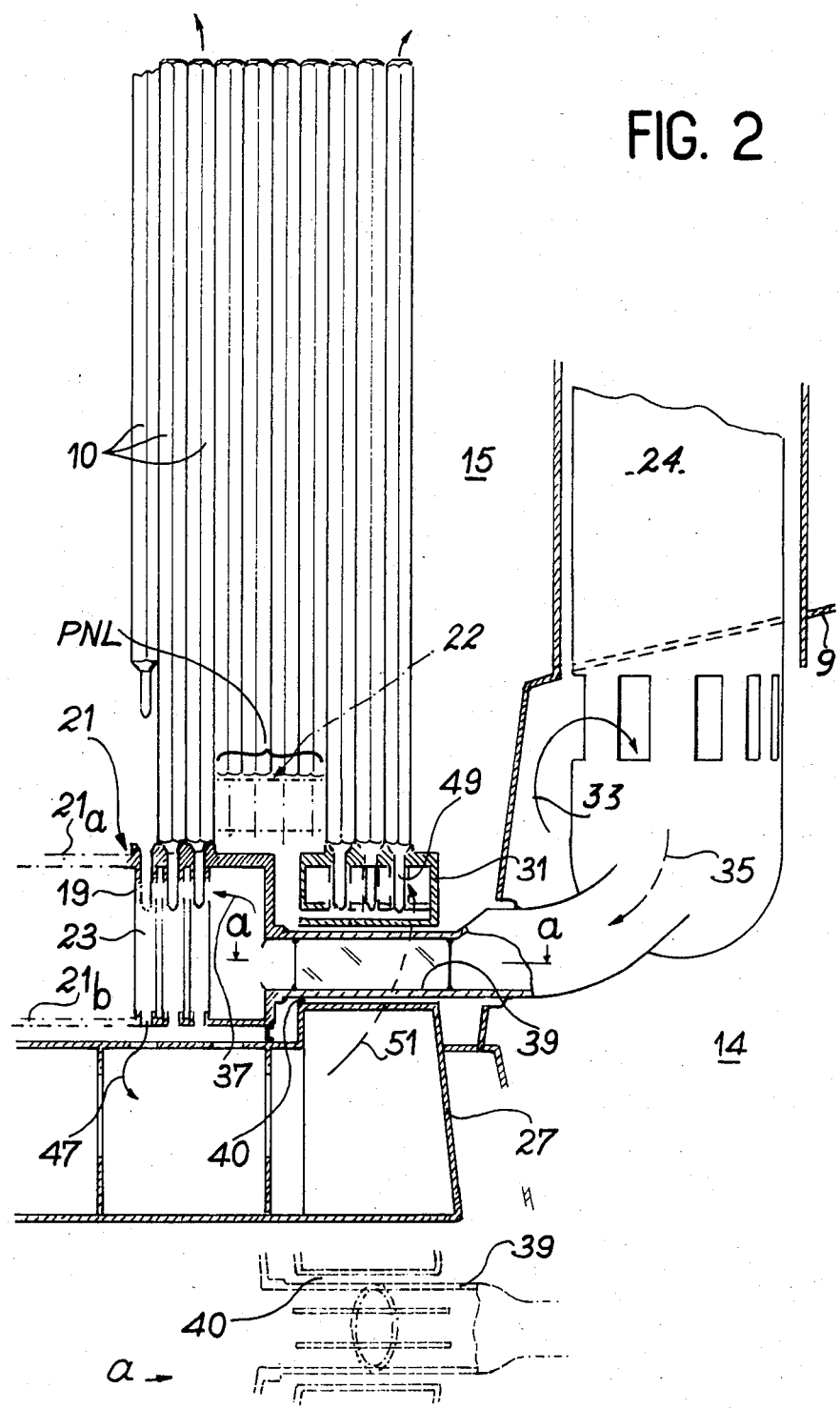
FIG. 2 a larger scale view of the storage structure of the reactor of FIG. 1, including a detail a more particularly showing the elliptical section of the pipes connecting the circulating pumps to the storage structure.

Nuclear reactor 1 has a storage structure 31 for the assemblies independent of the core structure 31. Structure 31 rests directly on flooring 27, by which it is hydraulically supplied with cold liquid metal. Therefore, it constitutes an autonomous structure independent of structure 21. It is arranged concentrically within the latter. As can be seen in FIG. 2, the cold liquid metal is drawn into collector 14, i.e. beneath the separating partition 9, in the manner shown by arrow 33 and is then delivered in accordance with arrow 35 into the core structure for introduction into the feet or bases of the fuel assemblies 10, in the manner indicated by arrow 37.

Between assemblies 10 of the core and those of the storage structure 31, there are the assemblies constituting the lateral neutron protection resting on the core structure 21 via a false structure 22.

Pipes 39, which connect pumps 24 to structure 21, traverse the flooring 27. In order that these pipes can be housed in the height remaining available in the storage structure 31, their cross-section can be flattened so as to have an elliptical shape, as is shown in detail a, which shows a pipe 39 and its cross-section in mixed line form, as well as the passage 40 made in flooring 27 for said pipe.

Figure 5:
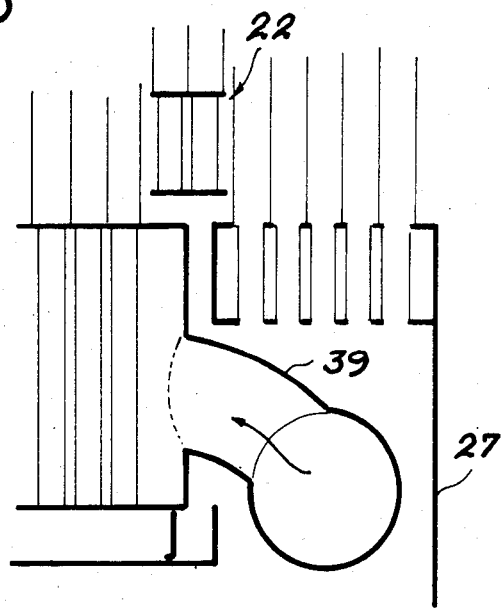
FIGS. 5 and 6 two variants of a storage structure according to the invention.

The core structure can also be supplied through the storage structure by splitting the supply pipe into smaller diameter pipes (FIG. 5).

Figure 6:
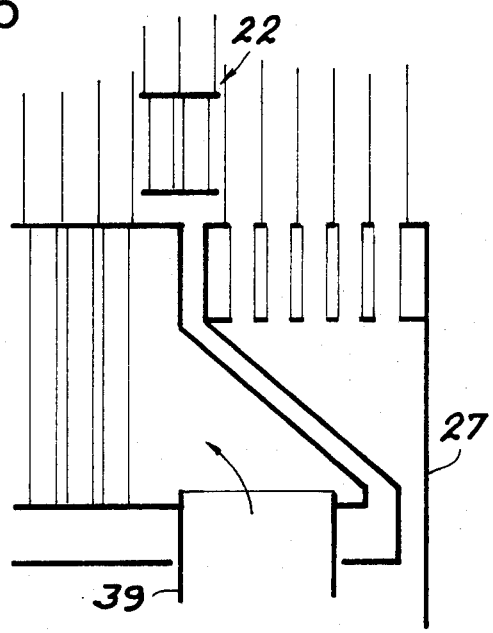

Another variant consists of supplying the core structure from below through the flooring (FIG. 6).

Figure 3:
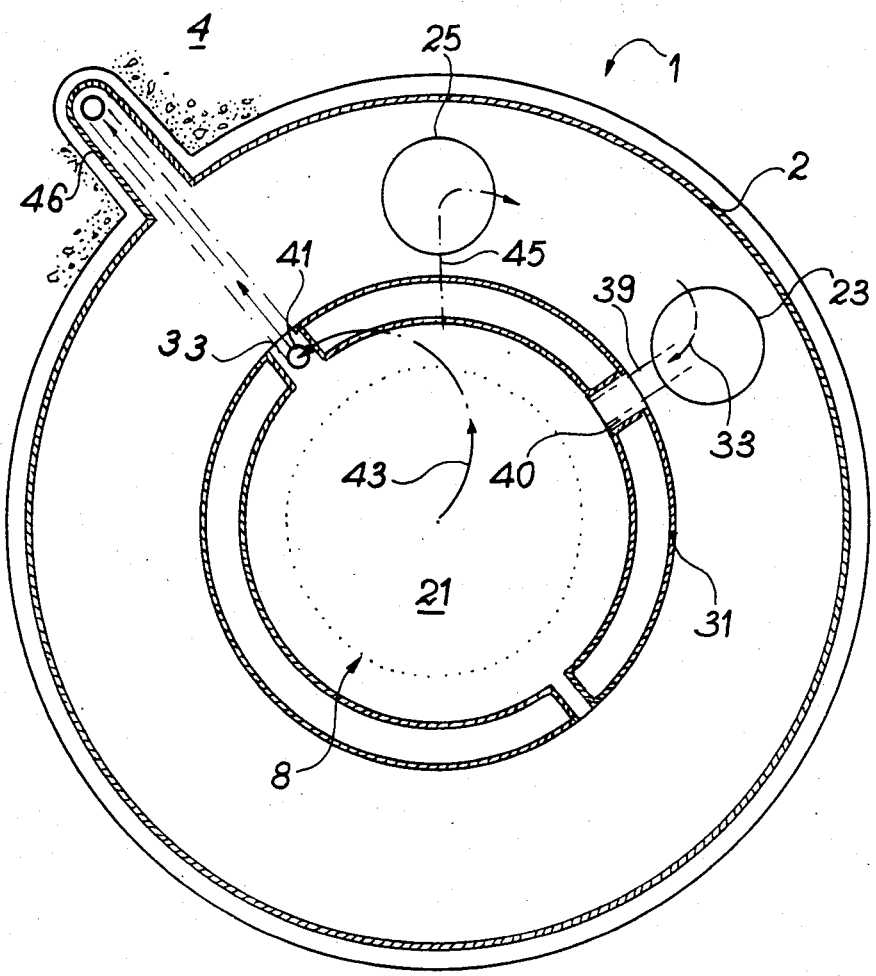
FIG. 3 diagrammatically, a cross-sectional view along line IV of FIG. 1 of the reactor equipped with a two-part storage structure.

FIG. 3 is a diagrammatic cross-sectional view along line IV—IV of FIG. 1 of the nuclear reactor equipped with a storage structure 31 according to the invention. As can be seen, the storage structure is in two parts, each of them being shaped like a half-ring. One of the spaces, in this case 33, located between these two half-rings is left sufficiently wide to permit the installation of the reactor loading and unloading station.

Thus, during the unloading operation, assemblies are extracted from core 8 and transferred by means of a handling arm, as indicated by arrows 43 (FIGS. 1 and 3) into a handling container 41 of the loading and unloading stations arranged at the periphery of core 8. Container 41 can move on an oblique ramp 46 passing into the interior of vessel 2 and traversing the upper slab 4.

The space 33 left free by the two half-rings forming storage structure 31, makes it possible to move the loading and unloading station 41 close to the core periphery and consequently reduce the dimensions, particularly the external diameter, of vessel 2. This makes it possible to considerably reduce the cost of the reactor.

FIG. 3 also shows the arrangement of the pumps and exchangers concentrically to the core. Only one pump 24 and one exchanger 25 are shown, in order not to overburden the drawing. The broken lines indicates the circulation of the liquid cooling metal. Arrow 45 (FIGS. 1 and 3) indicates the drawing in or suction of the hot liquid metal from the core into the heat exchanger 25. Arrow 33 (FIGS. 2 and 3) indicates the delivery under pressure of the cooled liquid metal, after its passage in the exchangers, into the core structure 21. FIG. 3 also shows a pipe 39 connecting pump 24 to core structure 21.

Figure 4:
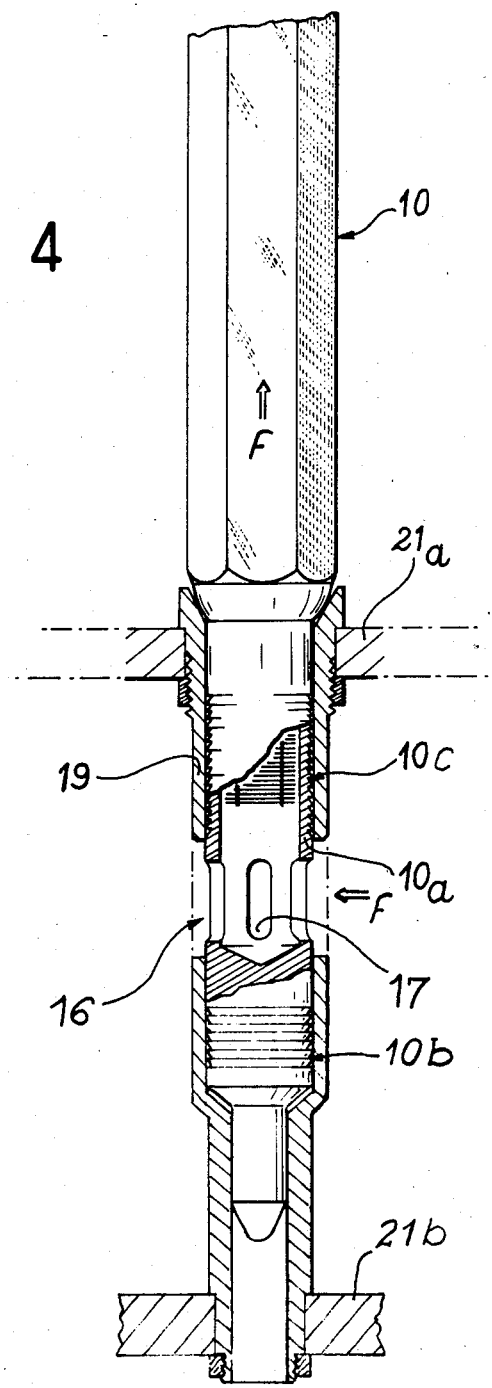
FIG. 4 a view showing an example of the fixing of an assembly in the structure.

In order to illustrate the way in which the cold liquid metal leaks are produced in the direction of the flooring, FIG. 4 shows the way in which the fuel assemblies are maintained in a core structure. Naturally, this is only an example and other modes of fixing these assemblies could be envisaged.

Structure 21 comprises two perforated plates 21a, 21b, into which are fitted stays 19. The foot 10a of assembly 10 is introduced into each stay, which ensures the supporting of assembly 10, as well as the cold liquid sodium supply to the foot of the assembly through oblong holes 16, 17 made at the same level in the stay and the foot of the assembly.

In order to ensure the hydraulic locking of assembly 10, on the outerface of its foot and on either side of the oblong supply holes 16, 17 are provided labyrinths 10b, 10c.

However, the sealing at these labyrinths is only relative, so that there is a leakage flow to the flooring, as described hereinbefore. Moreover, it should be noted that the liquid sodium which passes through labyrinth 10b undergoes a pressure drop, in such a way that the pressure in flooring 27 and storage structure 31 is much lower than that in core structure 21. This low pressure cold liquid metal supplies the bases or feet 49 of the stored assemblies.

In addition, the pressure within the storage structure is slightly higher than that in the hot collector. Thus, there is a forced circulation of cold liquid metal from bottom to top in the stored assemblies, as indicated by arrow 51 in FIG. 2. An effective cooling of the stored assemblies consequently ensures a good evacuation of the residual power.

In the case of the constructional variant of the reactor shown in the right-hand half-view of FIG. 1, i.e. the variant having a baffle 11 and a counter-baffle 13, the leaks of the assembly feet are also used for supplying cold liquid metal to the annular space between main vessel 2 and baffle 11. This is obtained by producing two independent leak recovery areas beneath the core structure 21, one supplying the annular space of baffle 11 and the other the storage structure 31, as indicated by the arrows in FIG. 1.

As the manufacturing tolerances are greater and as the clearances between the stored assemblies and the lateral neutron protection assemblies can be greater in order to accept large bending or cambering effects, the precision of the construction of the storage structure 31 can be reduced, which reduces manufacturing costs.

Another advantage of the storage structure according to the invention is that as the latter is at low pressure, it is possible to use larger diameter flow rate control openings and thus to eliminate risks of blockages, unlike in the case of the high pressure storage structure according to the prior art which, to obtain low liquid cooling metal flow rates in the stored assemblies, required small diameter flow rate control openings.

With regards to the reduction of the diameter of the core structure 21 within which a high pressure prevails, it should be noted that the invention makes it possible to reduce it to the indispensable minimum. For example, for a reactor of 1500 MWe, the diameter of this high pressure structure passes from 8.25 to 6.50 m which, as indicated hereinbefore, makes it possible to pass this structure through a small diameter opening of the rotary plug.

The location of the loading and unloading station on a radius equal to that of the storage structure 31 makes it possible to reduce the diameter of the main vessel and access vertically of the loading and unloading container with a large rotary plug with a diameter of 10 m, whereas hitherto it was 11.2 m for a reactor of 1500 MWe. Finally, this makes it possible to reduce the length of the handling arms of the assemblies and the angular travel of said arm.

It must be possible to introduce the structure through the hole provided in slab 4 for receiving the large rotary plug. The reduction in the diameter of structure 21 from 8.25 to 6.50 m reduces to the same extent the limit of the minimum diameter of the large rotary plug resulting from this constraint. Thus, the minimum diameter of the large rotary plug decreases from 9 to 7.25 m.

Unlike in the prior art, where the loading and unloading station of the core was in the lateral neutron protection, the invention has the advantage of positioning this station outside said protection and consequently ensures the continuity of the protection over the entire core periphery.

What is claimed is:

1. A fast neutron nuclear reactor, which comprises a vessel containing a liquid cooling metal, a core immersed in this metal, the vessel having a flooring on which rests a structure for the core, said core being constituted by a juxtapositioning of assemblies fixed into the structure, the liquid cooling metal circulating in an upwards manner in the core, the liquid metal being called "cold liquid metal" before its circulation in the core and "hot liquid metal" after it has passed into the latter, wherein it comprises a fuel element storage structure, which is independent of the core structure and is arranged concentrically with respect to the latter and rests on the flooring, the core structure and the independent storage structure each comprising upper and lower perforated plates and stays, each stay having an inner cylindrical through housing for receiving a foot of a fuel assembly, said stays being fitted in the plates, relative labyrinth upper and lower sealing means provided between the foot of said assembly and said stay, said relative sealing means letting leaks go through them, the plates of said core structure determining a volume which is communicated with a volume underneath said lower plate, so that the leaks which take place through said lower labyrinth sealing means feed the volume underneath the lower plate with cold liquid metal and, then, the fuel assemblies of the independent core structure.

2. A reactor according to claim 1, wherein the storage structure hydraulically connected to the flooring is constituted by several modules.

3. A reactor according to claim 1, wherein the storage structure connected hydraulically to the flooring is constituted by a complete one-piece ring.

4. A reactor according to claims 2 or 3, wherein the transfer of the assemblies out of the reactor vessel is effected by means of a loading and unloading container, the storage structure having a free space in which is located the reactor assembly loading and unloading station.

5. A reactor according to claim 3, wherein the storage structure is formed in one piece with the flooring.

6. A reactor according to claim 2, wherein the modules constituting the storage structure are placed and fixed on the flooring.

7. A reactor according to claim 1, wherein the storage structure hydraulically connected to the flooring is constituted by two half-rings.

* * * * *